INVENTORS W. S. BOYLE
H. W. VERLEUR
BY David P. Kelley
ATTORNEY

United States Patent Office 3,509,348
Patented Apr. 28, 1970

3,509,348

OPTICAL MEMORY DEVICE UTILIZING METAL SEMICONDUCTOR PHASE TRANSITION MATERIALS

William S. Boyle, Summit, and Hans W. Verleur, Plainfield, N.J., assignors to Bell Telephone Laboratories, Incorporated, Murray Hill, N.J., a corporation of New York

Filed Sept. 18, 1967, Ser. No. 668,503
Int. Cl. H03k *19/14*
U.S. Cl. 250—211 8 Claims

ABSTRACT OF THE DISCLOSURE

An optical memory device utilizes the variable absorptivity characteristics of materials which undergo a metal-semiconductor phase transition. The power versus temperature characteristic of the material, when the material is coupled to an appropriate heat sink, exhibits two stable temperature states, one above and one below the transition temperature. The device is accessed by two light beams.

BACKGROUND OF THE INVENTION

This invention relates to memory devices and more particularly to optical memory devices which utilize the variable absorptivity property of materials which are characterized by a metal-semiconductor phase transition.

Recent advances in technology, notably the development of the laser, have brought feasible optical communication systems nearer to reality. As with most communication systems, however, a memory is needed to store information, and methods must be developed to access that information. In particular, in an optical memory system it is desirable to have a bistable optical memory device which can be controlled by light beams. In order that large quantities of information might be stored in a small area the memory device should be small in size and readily fabricated.

The basic functions performed by any memory system include writing, read out, erase and, of course, memory. In the optical memory in accordance with the present invention, the writing, read out and erase functions may be performed by one or more light beams and the memory function is performed by utilization of the variable absorptivity property of materials which are characterized by a metal-semiconductor phase transition. In these materials it has been found the the absorption of light (i.e., radiation, in general) by the material is highly dependent on the temperature of the material. The metal-semiconductor phase transition is characterized by a transition temperature below which the material is a semiconductor and above which it is metallic. At this temperature the absorptivity (and absorption coefficient) of the material increases abruptly as the temperature increases. Materials included in this class are vanadium monoxide, vanadium dioxide, vanadium sesquioxide and titanium trioxide which have respective transition temperatures of about —148° C., 68° C., —95° C. and 327° C. In addition, the absorptivity of these materials has been found to be frequency dependent, the absorptivity for temperatures below the transition temperature typically being less in the near infrared than in the visible portion of the spectrum. Both the temperature and frequency dependent properties are utilized in the optical memory device in accordance with the present invention.

SUMMARY OF THE INVENTION

A memory module in accordance with one embodiment of the invention comprises a thin layer of variable absorptivity material deposited on a pedestal-like heat sink.

The power versus temperature characteristic of the structure exhibits two stable temperature states, one above and one below the transition temperature $T_c$ of the variable absorptivity material. Two light beams are used to control the state of the module. One of the light beams is typically infrared and is used to bias the module in its low temperature state, whereas the other beam is visible, and is used to switch (i.e., the writing function) the module to its high temperature state. When $T<T_c$ and only the bias beam is incident upon the module, the absorptivity of the material at infrared wavelengths is low and, consequently, little energy is obsorbed from the infrared bias beam and the module is in its low temperature state. When, however, the visible switching beam is also made incident upon the module, energy is absorbed from that beam to heat the material since the absorptivity at visible wavelengths is high. When sufficient heat is absorbed, the temperature of the material exceeds $T_c$, the absorptivity abruptly increases, and the module switches to its high temperature state. In this state the absorptivity of the material at the infrared wavelength of the bias beam is high and sufficient energy is absorbed from the bias beam alone to maintain the module in its high temperature state. Thus, the module performs a memory function by remaining in its high temperature state even in the absence of the switching beam.

BRIEF DESCRIPTION OF THE DRAWINGS

The above and other features of the invention, together with its various advantages, will be easily understood from the following more detailed description taken in conjunction with the accompanying drawings, in which.

DETAILED DESCRIPTION

Figure 1:
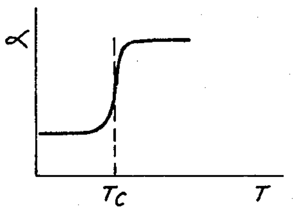
FIG. 1 is a graph of absorptivity versus temperature for a variable absorptivity material.
Figure 2:
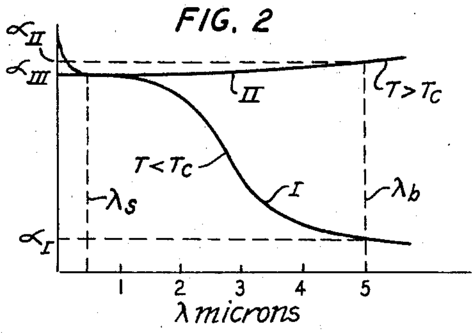
FIG. 2 is a graph of absorptivity versus wavelength for a variable absorptivity material.

As discussed previously, the absorptivity of a typical variable absorptivity material is both temperature and frequency dependent. Turning now to FIG. 1, there is shown a graph of absorptivity $\alpha$ versus temperature for such a material. The material undergoes at the temperature $T_c$ a metal-semiconductor phase transition which is characterized by an abrupt increase in absorptivity at $T_c$. FIG. 2, on the other hand, is a graph of absorptivity $\alpha$ versus the wavelength of incident light $\lambda$. When $T<T_c$ the absorptivity decreases with increasing wavelength, as shown by cure I. For $T>T_c$, the absorptivity is more nearly constant between $0.5\mu$ and $5\mu$ wavelength, but the values of $\alpha$ are greater for $T>T_c$ than for $T<T_c$ as shown by curve II.

Figure 3:
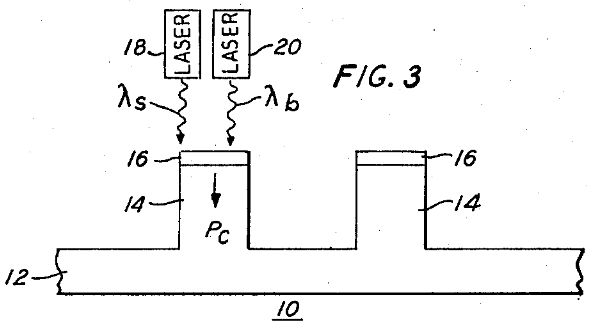
FIG. 3 is a schematic of one embodiment of the invention.

Both of these characteristics are utilized in a memory module in accordance with one embodiment of the invention as shown in FIG. 3. The module 10 comprises a heat sink 12 upon which have been formed a plurality of pedestal-like members 14. On each pedestal 14 is deposited a thin film 16 of a variable absorptive material.

Figure 4:
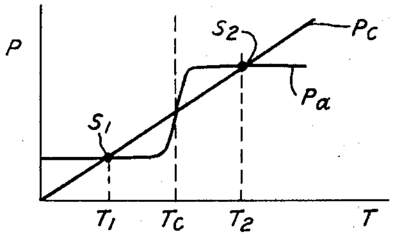
FIG. 4 is a graph of power versus temperature for the embodiment of the invention as shown in FIG. 3.

The power versus temperature characteristic of the module 10 is shown in FIG. 4. The curve label $P_a$ represents the power absorbed by the variable absorptivity material. Curve $P_a$ exhibits an abrupt increase at $T_c$ to correspond with the abrupt increase in $\alpha$ as shown in FIG. 1. The curve labeled $P_c$ represents the power conducted by the pedestal 14. Curve $P_c$ varies linearly with temperature and intersects curve $P_a$ in three points corresponding to the stable temperature states $S_1$ and $S_2$ at temperatures $T_1$ and $T_2$, respectively, and one unstable state at the transition temperature $T_c$.

Two light beams, a bias beam and a switching beam, typically generated respectively by lasers 18 and 20, are used to control the state of the memory module 10. The bias beam is used to maintain the module in its low temperature state $S_1$ and is at a wavelength $\lambda_b$ (e.g., $5\mu$ for $VO_2$) as shown in FIG. 2, such that the corresponding absorptivity is low for $T<T_c$ ($\alpha_I$, curve I) and high for $T>T_c$ ($\alpha_{II}$, curve II). The switching beam is used to switch the module to its high temperature state $S_2$ and is at a wavelength $\lambda_s$ (e.g., $0.5\mu$ for $VO_2$) such that the corresponding absorptivity $\alpha_{III}$ is high for both $T<T_c$ and $T>T_c$.

The memory and writing functions of the device are performed as follows. With $T<T_c$ and only the bias beam incident upon the thin film 16, little energy is absorbed from the beam inasmuch as the absorptivity is small at $\lambda_b$ ($\alpha_I$, FIG. 2). The beam is transmitted through the member 14 which is transparent at both $\lambda_b$ and $\lambda_s$. The module is therefore in its low temperature state $S_1$ (FIG. 4). When the switching beam is also made incident upon the thin film 14 (i.e., the writing function) it is highly absorbed inasmuch as the absorptivity is high at $\lambda_s$ ($\alpha_{III}$, FIG. 2). The energy absorbed from the switching beam heats the thin film thereby increasing its temperature above the transition $T_c$ and causing an abrupt increase in absorptivity, most notably at wavelength $\lambda_b$ (curve II, FIG. 2). The module is therefore switched to its high temperature state $S_2$ (FIG. 4). Sufficient energy is now absorbed from the bias beam alone so that when the switching beam is removed the module remains in its high temperature state $S_2$ (i.e., the memory function).

The read out function requires sensing the state of the memory module 10 and may generally be performed by coupling a photodiode to each module to sense whether the bias beam is being absorbed as transmitted or by merely sensing the reflectivity by a light beam making use of the same beam steering as used for the writing function.

Figure 5:
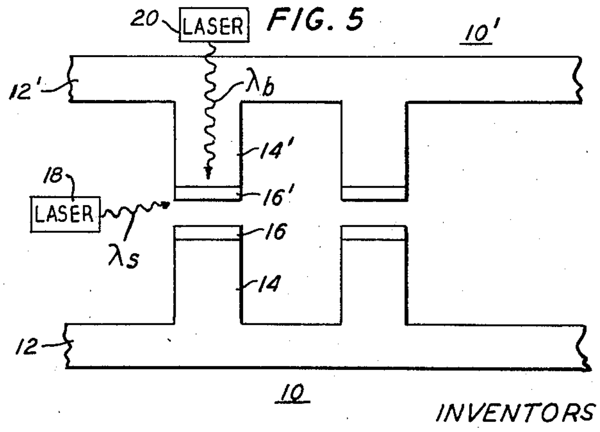
FIG. 5 is a schematic of another embodiment of the invention.

The erase function, which requires switching the module back to its low temperature state $S_1$, may be performed most directly by turning off the bias beam. If, however, it is undesirable to turn off the bias beam, the erase function may be accomplished by either of the structures shown in FIG. 5 or 6. As shown in FIG. 5, a complementary module 10', which is disposed opposite the memory module 10, is substantially identical to the module 10. It comprises a heat sink 12' upon which has been formed a pedestal 14'. A thin film 16' of a variable absorptivity material is deposited on the pedestal 14'. The bias beam $\lambda_b$ is transmitted through both the pedestals 14 and 14' and the thin films 16 and 16'. Consider the situation with module 10 in its high temperature state $S_2$. It is desired to switch that module to state $S_1$. This may be accomplished by turning off the bias beam, or equivalently by preventing the bias beam $\lambda_b$, typically generated by laser 20, from being incident upon the thin film 16 by making the switching beam $\lambda_s$, typically generated by laser 18, incident upon the thin film 16'. The result is that thin film 16' is heated by the switching beam and thereby caused to undergo a semiconductor metal phase transition. Its absorptivity increases abruptly and it therefore absorbs substantially all the energy from the bias beam $\lambda_b$. The thin film 16 therefore cools down and switches back to its low temperature state $S_1$.

Figure 6:
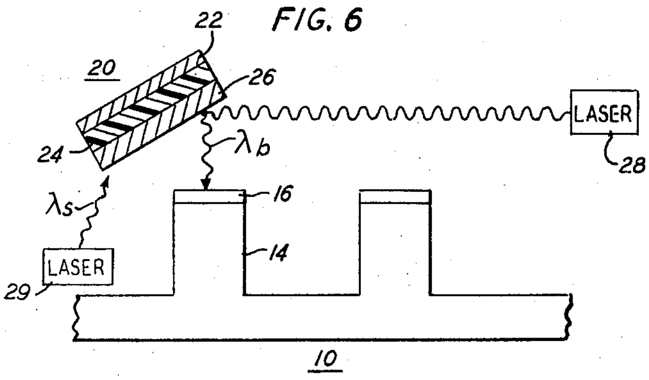
FIG. 6 is a schematic of still another embodiment of the invention.
Figure 7:
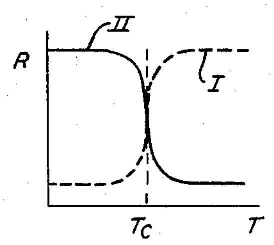
FIG. 7 is a graph of reflectivity versus temperature for a portion of the invention as shown in FIG. 6.

An alternative erase mechanism is shown in FIG. 6. Use is made of a variable reflectivity device 20 comprising a reflector 22, a dielectric 24 deposited on one surface of the reflector 22, and a thermoreflectance layer 26 deposited on the dielectric 24. The device 20 is disposed at an angle to the module 10 such that the bias beam $\lambda_b$ (typically generated by laser 28), after being reflected from the thermoreflective layer 26, is transmitted through the thin film 16 and the pedestal 14 of module 10. The thermoreflectance layer 26 undergoes a metal-semiconductor phase transistion accompanied by an abrupt increase in reflectivity at a transition temperature $T_c$ (curve I, FIG. 7) in much the same way that the variable absorptivity material undergoes an abrupt increase in absorptivity. In fact, the variable absorptivity materials previously discussed are also thermoreflectance materials. The device 20, however, undergoes an abrupt decrease in reflectivity at the transition temperature, as shown by curve II of FIG. 7. It is this latter characteristic that makes possible the use of this structure to perform the erase function. Consider the situation again with module 10 in its high temperature state $S_2$. Device 20 is in its high reflectivity state so that most of the energy of bias beam $\lambda_b$ is reflected and made incident upon thin film 16 thereby maintaining module 10 in state $S_2$. When, however, the switching beam $\lambda_s$ (typically generated by laser 29) is made incident upon thermoreflectance layer 26, it is absorbed causing the layer 26 to heat up and undergo a phase transition. Consequently, the reflectivity of device 20 decreases abruptly and little of the energy of bias beam $\lambda_b$ is reflected onto thin film 16. The thin film 16 then cools down and switches the module 10 back to its low temperature state $S_1$.

Figure 8A:
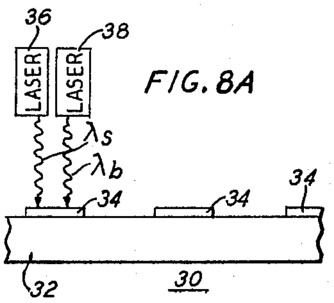
FIG. 8A is a schematic of yet another embodiment of the invention.
Figure 8B:
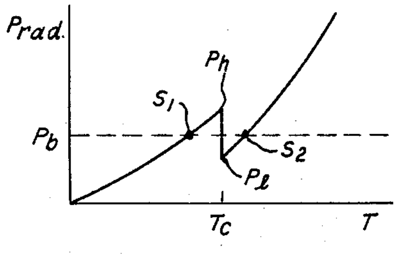
FIG. 8B is a graph of power versus temperature for the embodiment of the invention as shown in FIG. 8A.

A memory module which employs only the aforementioned thermoreflective properties is shown in FIG. 8A. The memory module 30 comprises a heat sink 32 upon which have been deposited a plurality of thin films 34 of a thermoreflectance material such as vanadium dioxide. As discussed previously, the reflectivity of a thermoreflectance material increases abruptly at the transition temperature. The emissivity therefore decreases abruptly. Because the power radiated by a body is linearly proportional to emissivity, it too decreases abruptly at the transition temperature $T_c$, as shown in FIG. 8B. Below and above the transition temperature $T_c$ the power radiated follows the well known Stefan-Boltzmann law. The power radiated characteristic exhibits two transition power levels, $P_h$ at a temperature just below $T_c$ and $P_l$ at a temperature just above $T_c$. To switch from $S_1$ to $S_2$ the power is increased above $P_h$ whereas to switch from $S_2$ to $S_1$ the power is decreased below $P_l$.

Consider the state of module 30 when a bias beam $\lambda_b$, typically generated by laser 38, is incident upon a thermoreflectance layer 34. The power $P_b$ of the bias beam establishes two stable temperature states $S_1$ and $S_2$ at temperatures $T_1$ and $T_2$, one above and one below the transition temperature $T_c$. When only the bias beam is incident upon layer 34, the module is in state $S_1$. When, however, a switching beam $\lambda_s$, typically generated by laser 36, is also made incident thereon, the layer 34 heats up, sufficient power (i.e., greater than $P_h$, FIG. 8B) being absorbed to switch the module to the high temperature state $S_2$. After the switching beam is removed, and only the bias beam is present, the module remains in state $S_2$ thus exhibiting memory. The erase function is performed by cooling the module below the value $P_l$ as shown on FIG. 8B (i.e., by removing the bias beam).

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, all of the access functions (write, read or erase) described above are performed optically by means of light beams. It is clear, however, that any of these functions could readily be performed electrically by sensing the large conductivity changes (analogous to the aforementioned absorptivity and reflectivity changes) associated with the metal-semiconductor phase transition.

What is claimed is:

1. An optical memory device comprising
a thin film member which undergoes a metal-semiconductor phase transition at a transition temperature,
means for stabilizing said member in a high or a low temperature state, the high state being above the transition temperature and the low state being below the transition temperature,
optical means for supplying power to said member to bias said member in the low temperature state comprising means for irradiating said member with optical energy, and
optical means for switching said member from the low stable temperature state to the high state comprising means for irradiating said member with optical energy thereby causing said member to undergo a metal-semiconductor phase transition.

2. The optical memory device of claim 1 wherein said thin film member comprises a variable absorptivity material having the property that its power absorption versus temperature characteristic exhibits an abrupt increase at the transition temperature, and
said stabilizing means comprises a heat sink upon which is deposited said thin film member, said heat sink having the property that its power conducted versus temperature characteristic intercepts the power absorption characteristic of said member at the two temperatures of the high and low stable states.

3. The optical memory device of claim 2 wherein
said variable absorptivity material is further characterized by an absorptivity which, for temperatures below the transition temperature, decreases with increasing wavelength of incident radiant energy, and which, for temperatures above the transition temperature, is approximately constant with increasing wavelength,
said bias means comprises a first radiant energy beam incident upon said member, said beam having a wavelength such that it is highly absorbed when the temperature of said member is greater than the transition temperature, and highly transmitted when the temperature of said member is less than the transition temperature, and
said switching means comprises a second radiant energy beam incident at selected times upon said member, said beam having a wavelength such that it is highly absorbed at all temperatures of said member.

4. The optical memory device of claim 3 in combination with means for switching said member from the high to low temperature state comprising means for preventing said bias beam from being incident upon said member.

5. The optical memory device of claim 4 wherein said means for switching said member from the high to the low temperature state comprises a second variable absorptivity member disposed between said first member and said bias beam,
means for causing said second member to undergo a metal-semiconductor phase transition thereby to undergo an abrupt increase in absorptivity.

6. The optical memory device of claim 4 wherein said means for switching said member from the high to the low temperature state comprising a variable reflectivity device comprising
a reflector,
a dielectric layer deposited on one surface of said reflector,
a thermoreflectance layer deposited on said dielectric layer, said thermoreflectance layer being characterized by a metal-semiconductor phase transition and disposed so as to reflect said bias beam onto said member, and
means for causing the reflectivity of said variable reflectivity device to decrease comprising means for causing said thermoreflectance layer to undergo a metal-semiconductor phase transition.

7. The optical memory device of claim 1 wherein
said thin film member is characterized by a power radiated versus temperature characteristic which exhibits an abrupt decrease at the transition temperature and further characterized by a first transition power level at a temperature substantially equal to but slightly less than the transition temperature, and a second transition power lever at a temperature substantially equal to but greater than the transition temperature, and
said switching means comprises means for increasing the power supplied to said member to a value greater than the first transition power level.

8. The optical memory device of claim 7 in combination with means for switching said member from the high to the low temperature state comprising means for decreasing the power supplied to said member to a value less than the second transition power level.

References Cited

UNITED STATES PATENTS

| | | | |
|---|---|---|---|
| 3,020,406 | 2/1962 | Whitney | 350—160 |
| 3,183,359 | 5/1965 | White | 350—160 |
| 3,270,291 | 8/1966 | Kosonocky | 331—94.5 |
| 3,271,578 | 9/1966 | Bockemuehl | 350—160 |
| 3,351,698 | 11/1967 | Marinace | 317—235.27 |
| 3,402,300 | 9/1968 | Pearl | 350—160 X |
| 3,406,299 | 10/1968 | Nanney | 307—310 X |
| 3,415,996 | 12/1968 | Grimeiss | 317—235.27 |

OTHER REFERENCES

W. Anacker et al., "Beam-Operated Memory Cells," IBM Technical Disclosure Bulletin, vol. 9, No. 6, November 1966, pp. 737–38.

RALPH G. NILSON, Primary Examiner

C. M. LEEDOM, Assistant Examiner

U.S. Cl. X.R.

250—217; 307—238, 278, 310, 311; 317—235; 350—160